(12) United States Patent
Potratz et al.

(10) Patent No.: US 12,305,761 B2
(45) Date of Patent: May 20, 2025

(54) SYSTEM AND METHOD OF ALIGNING A MAIN SHAFT OF A GYRATORY CRUSHER

(71) Applicant: Metso Outotec USA Inc., Waukesha, WI (US)

(72) Inventors: Matthew A. Potratz, Waukesha, WI (US); Aayush Sharma, Jaipur (IN)

(73) Assignee: Metso Outotec USA Inc., Brookfield, WI (US)

( * ) Notice: Subject to any disclaimer, the term of this patent is extended or adjusted under 35 U.S.C. 154(b) by 376 days.

(21) Appl. No.: 17/715,155

(22) Filed: Apr. 7, 2022

(65) Prior Publication Data

US 2023/0323952 A1   Oct. 12, 2023

(51) Int. Cl.
*F16J 15/34* (2006.01)
*B02C 2/04* (2006.01)

(52) U.S. Cl.
CPC .............. *F16J 15/344* (2013.01); *B02C 2/04* (2013.01)

(58) Field of Classification Search
CPC ... B02C 2/04; F16J 15/344; F16J 15/16; F16J 15/32; F16J 15/3204; F16J 15/3224; F16J 15/3268
USPC ........................................................ 241/216
See application file for complete search history.

(56) References Cited

U.S. PATENT DOCUMENTS

| | | | |
|---|---|---|---|
| 5,964,422 A | * | 10/1999 | Ruokonen ................ B02C 2/02 241/216 |
| 6,446,977 B1 | | 9/2002 | Thiede |
| 6,536,693 B2 | | 3/2003 | Van Mullem et al. |
| 6,550,707 B2 | | 4/2003 | Zortman et al. |
| 7,931,223 B2 | | 4/2011 | Lee |
| 8,646,712 B2 | | 2/2014 | Johansson |

(Continued)

FOREIGN PATENT DOCUMENTS

| | | |
|---|---|---|
| AU | 2011249096 B2 | 11/2011 |
| CN | 203184062 U | 9/2013 |

(Continued)

OTHER PUBLICATIONS

International Search Report and Written Opinion for International Application No. PCT/US2023/065495, mailed Aug. 17, 2023.

(Continued)

*Primary Examiner* — Jimmy T Nguyen
*Assistant Examiner* — Teresa A Guthrie
(74) *Attorney, Agent, or Firm* — Andrus Intellectual Property Law, LLP

(57) ABSTRACT

A gyratory crusher including a main shaft that can be installed into a main frame. The gyratory crusher includes an alignment system having a stationary dust collar and a separate alignment ring attached to the dust collar. The alignment ring includes a tapered contact surface extending from a lower outer edge to a top edge to guide a dust seal past the alignment ring and into contact with an outer surface of the dust collar. The dust seal is received within a receiving cavity of a dust seal retainer mounted to the main shaft of the crusher. A series of alignment openings extend through the dust seal retainer to provide access to an outer edge of the dust seal such that the position of the dust seal can be adjusted. The main shaft includes a chamfer on the lower end to guide the main shaft into a bushing assembly.

18 Claims, 12 Drawing Sheets

(56) References Cited

U.S. PATENT DOCUMENTS 10,814,329 B2    10/2020    Niklewski et al.
2014/0215788 A1   8/2014    Ford et al.

FOREIGN PATENT DOCUMENTS

| EP | 2775176 A1 | 9/2014 | |
|---|---|---|---|
| JP | 2004-136252 A | 5/2004 | |
| JP | 3866644 B2 | 1/2007 | |
| WO | 2017152927 A1 | 9/2017 | |
| WO | WO-2022053988 A1 * | 3/2022 | ............. B02C 2/005 |

OTHER PUBLICATIONS

Office Action for Eurasian Patent Application No. 202492590/31, mailed Feb. 18, 2025.

* cited by examiner

SYSTEM AND METHOD OF ALIGNING A MAIN SHAFT OF A GYRATORY CRUSHER

BACKGROUND

The present disclosure generally relates to a system for aligning the main shaft of a gyratory crusher during assembly. More specifically, the present disclosure relates to a dust collar having an alignment ring and a dust seal that can be properly aligned prior to installation of the main shaft into the lower frame of the crusher.

Cone crushers and gyratory crushers are two types of rock crushing systems which generally break apart rock, stone or other material in a crushing gap between a stationary element and a moving element. A cone or gyratory crusher is comprised of a head assembly including a crusher head that can include a replaceable mantle mounted to a main shaft that gyrates about a vertical axis within a stationary bowl attached to a main frame of the rock crusher. The crusher head is assembled surrounding an eccentric that rotates to impart the gyrational motion of the main shaft and crusher head, which crushes rock, stone or other material in a crushing gap between the crusher head and the stationary bowl. The eccentric can be driven by a variety of power drives, such as an attached gear, driven by a pinion and countershaft assembly, and a number of mechanical power sources, such as electrical motors or combustion engines.

The gyrational motion of the crusher head with respect to the stationary bowl crushes rock, stone or other material as it travels through the crushing gap. The crushed material exits the cone crusher through the bottom of the crushing gap.

A dust seal is typically provided between a dust collar, which carried by the stationary frame structure, and the movable crusher head to prevent the entrance of rock dust or the like into the operating mechanism of the crusher.

One problem associated with currently available gyratory crushers is the need for a person or persons to stand below the main shaft assembly as the main shaft assembly is lowered into the stationary main frame either during the initial assembly process or during maintenance that requires the main shaft assembly to be removed. Since the main shaft assembly can weigh thousands of pounds, there is apprehension among those assembling the gyratory crusher in standing beneath the main shaft assembly and manually aligning the main shaft and the associated dust seal relative to the stationary dust collar and bushing that receives the main shaft. Therefore, the present inventors have recognized the need to design a system that allows the main shaft assembly to be lowered into the stationary main frame without the need for a person or persons located below the main shaft assembly to properly align the main shaft, dust collar and dust seal.

SUMMARY

The present disclosure relates to a system for aligning the main shaft of a gyratory crusher during assembly. More specifically, the present disclosure relates to a dust collar having an alignment ring and a dust seal that can be properly aligned prior to installation of the main shaft into the lower frame of the crusher The system of the present disclosure is used to help align the main shaft of a gyratory crusher during the installation of the main shaft into the gyratory crusher to eliminate the need for a worker to manually guide the main shaft during installation. The system includes a dust collar that is mounted to the main frame of the crusher prior to installation. The dust collar is defined by a radial outer surface and includes a planar top mounting surface. The planar mounting surface includes a series of mounting holes such that a separate alignment ring can be attached to the mounting surface.

The alignment ring is designed and sized to be received upon and attached to the dust collar. The alignment ring includes a tapered contact surface that extends from a lower, outer edge of the alignment ring to a top edge of the alignment ring. The diameter of the alignment ring decreases from the lower, outer edge to the top edge. In one contemplated embodiment, the alignment ring includes a series of attachment openings that align with the mounting holes on the mounting surface of the dust collar such that a plurality of connectors can be used to secure the alignment ring to the dust collar.

The alignment system of the present disclosure further includes a dust seal retainer that receives a dust seal. The dust seal retainer includes an inner wall that has an inner diameter that is larger than the outer surface of the dust collar. When the dust seal is received in the dust seal retainer, the dust seal contacts the outer surface of the dust collar.

The dust seal retainer includes a receiving cavity that is sized to receive the dust seal and allow the dust seal to move into and out of the receiving cavity to allow for adjustment of the position of the dust seal. A series of adjustment openings are formed between an outer surface of the dust seal retainer and the internal receiving cavity. When the dust seal is received within the receiving cavity, the adjustment openings can be used to measure the distance from the outer surface of the retainer to the outer edge of the dust seal. The dust seal can be centered within the dust seal retainer by adjusting the distance to the outer edge of the dust seal at each of the plurality of adjustment openings.

In one contemplated embodiment of the present disclosure, the alignment system can include an annular splash ring mounted between the dust collar and the alignment ring. The splash ring extends radially inward from the dust collar to help restrict the splashing of oil or other lubricants out of the dust collar.

The present disclosure is further directed to a gyratory crusher that includes the alignment system described above. The gyratory crusher includes a main shaft having a lower portion defined by an outer surface having a first diameter and a lower end having a second diameter that is less than the first diameter. The main shaft further includes a chamfer that extends from the lower end of the main shaft to the outer surface of the lower portion. The chamfer allows the main shaft to be inserted into a bearing assembly that includes an inner surface having a third diameter that generally corresponds to the first diameter of the main shaft. Thus, when the main shaft is installed, the outer surface of the main shaft is in contact with the bearing assembly. The gyratory crusher includes the dust collar, dust seal retainer and dust seal to restrict the passage of debris during operation of the gyratory crusher.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
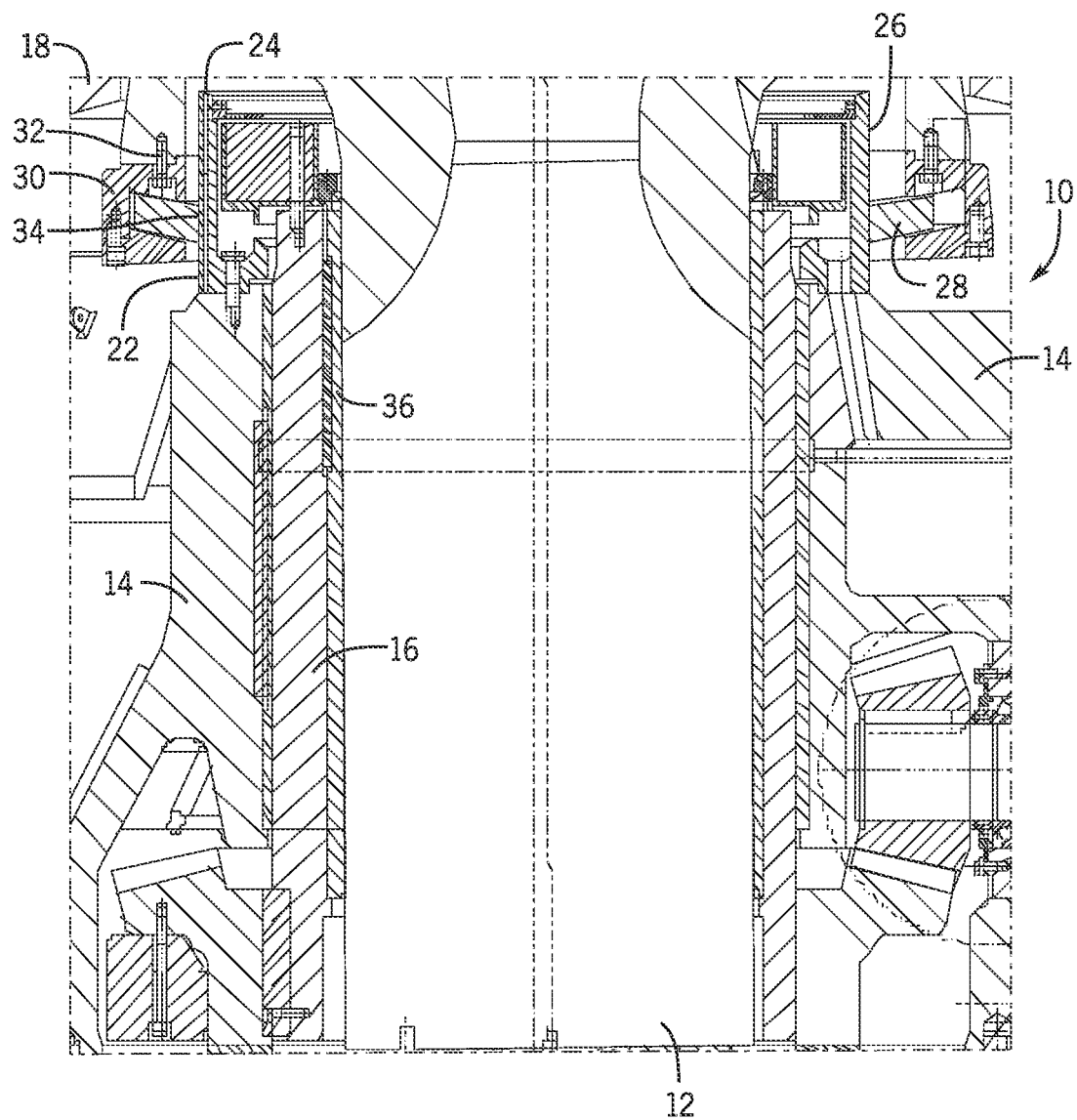
FIG. 1 is a section view of a gyratory crusher including a prior art dust seal and a dust collar.

FIG. 1 illustrates a section view of a prior art gyratory crusher 10 that is shown in an assembled, operative condition. The gyratory crusher 10 includes a main shaft 12 that is movably supported within a lower frame 14 of the crusher 10. The lower frame 14 is a stationary support that provides stability and support for an eccentric 16 that rotates and provides the gyratory motion to the main shaft 12. The main shaft 12 supports a mantle 18 that creates one of the two contact surfaces for crushing rocks and other material between the moving mantle 18 and a stationary bowl.

As shown in FIG. 1, a stationary dust collar 22 is mounted to an upper surface of the lower frame 14. Dust collar 22 includes a top end 24 that is received within a gap of the main shaft. The dust collar 22 includes an outer surface 26 that contacts a dust seal 28 mounted within a dust seal retainer 30 that is securely mounted to the main shaft 12 by a series of connectors 32. As shown in FIG. 1, an inner edge 34 of the dust seal contacts the outer surface 26 of the dust collar 22 to restrict the passage of dust and other debris past the dust seal 28. As shown in FIG. 1, the main shaft 12 is received within a stationary bushing 36. During the installation of the main shaft 12 into the prior art gyratory crusher 10 to the position shown in FIG. 1, both the bushing 36 and the dust collar 22 are stationary and the main shaft 12 and the attached mantle 18 and dust seal retainer 30 are lowered relative to the main frame. As can be understood in FIG. 1, the alignment of the dust seal 28 relative to the dust collar 22 as well as the main shaft 12 relative to the bushing 36 must be accurate in order to prevent damage to the components. As described above, typically a worker or multiple workers stand below the main shaft assembly as the main shaft assembly is lowered into the lower frame 14 to help guide the main shaft 12 into a proper position. The subject matter of the present disclosure has been designed to eliminate the need for such workers to be present below the main shaft assembly during the assembly process.

Figure 2:
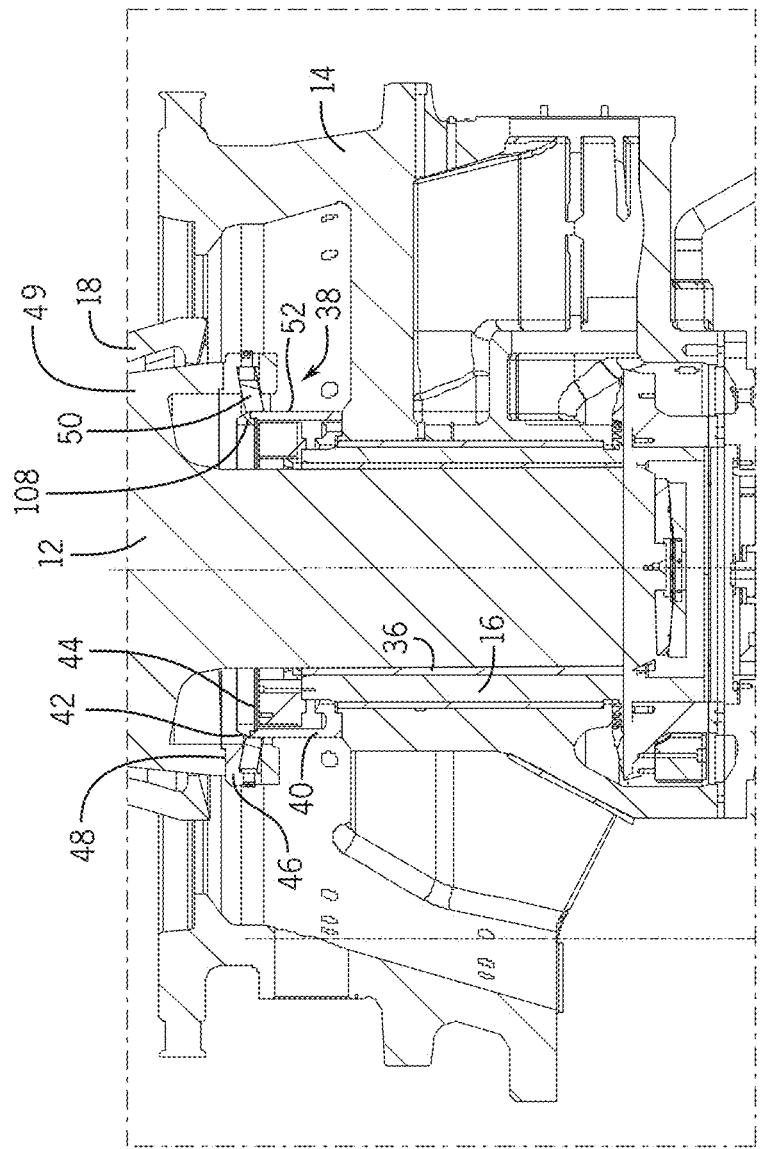
FIG. 2 is a section view of a gyratory crusher including the main shaft alignment system of the present disclosure, including a dust seal, dust collar and alignment ring.

FIG. 2 illustrates the improved design of a system for aligning the main shaft 12 within the lower frame 14 during the installation process. In the embodiment shown in FIG. 2, an improved dust sealing assembly 38 is shown positioned between the main shaft 12 and the lower frame 14. The dust sealing assembly 38 of the present disclosure includes a dust collar 40 that has been designed to include a separate and attached upper alignment ring 42 and a separate and attached annular splash ring 44. The dust collar 40, alignment ring 42 and splash ring 44 are designed to be separate components that are assembled together in a manner that will be described in greater detail below.

In addition to the components described above, the dust sealing assembly 38 further includes a dust seal retainer 46 mounted to a lower annular mounting edge 48 formed as part of the expanded diameter head portion 49 of the main shaft 12. The dust seal retainer 46 receives an annular dust seal 50. As illustrated in FIG. 2, the inner edge 108 of the dust seal 50 interacts with an outer surface 52 of the dust collar 40 to restrict the passage of debris and other material that exits the crushing chamber defined by the gyratory crusher. The details of the components of the dust seal retainer 46 and the dust seal 50 will be described in greater detail below.

Figure 3:
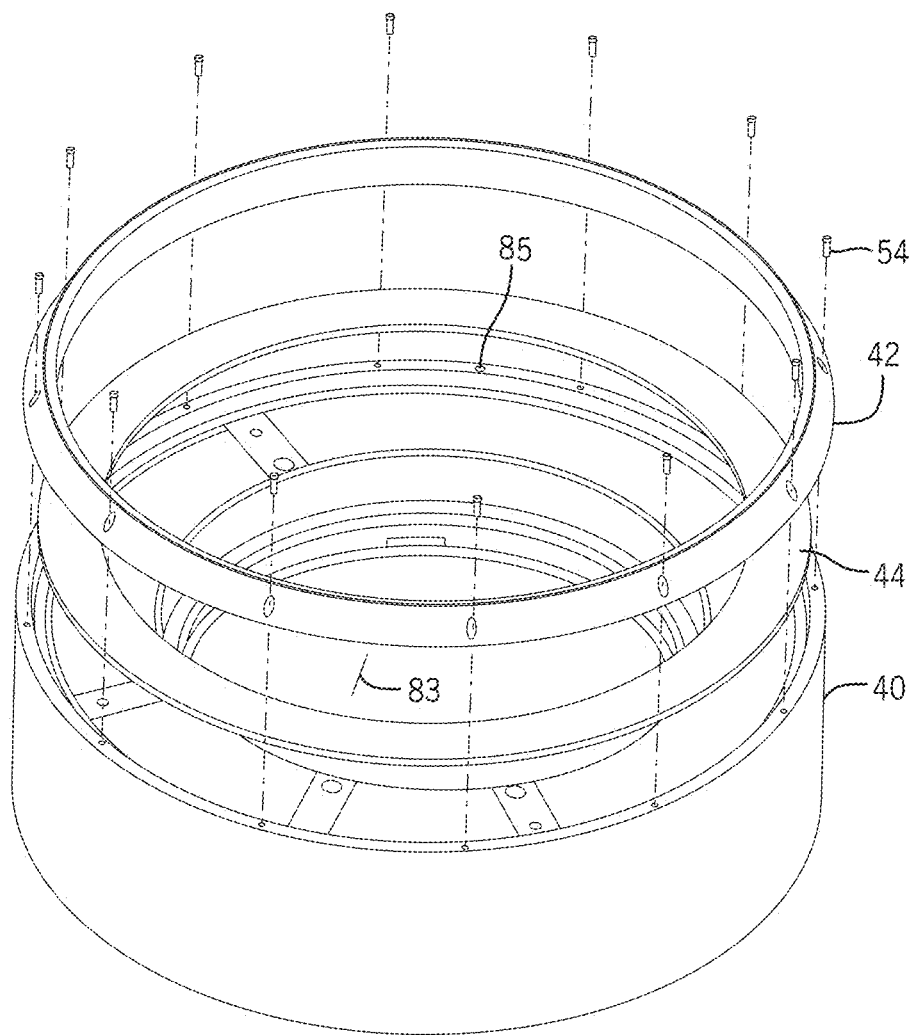
FIG. 3 is an exploded view of the main shaft alignment system shown in the section view of FIG. 2.
Figure 4A:
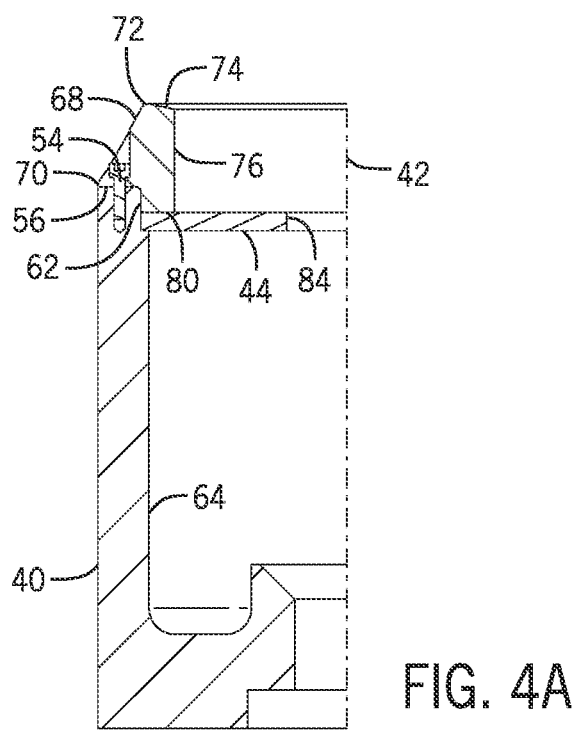
FIG. 4A is a section view showing the connection of the dust collar, alignment ring and splash ring.

FIG. 3 is an exploded view of the portions of the dust sealing assembly 38 that are mounted to the stationary frame. Specifically, FIG. 3 illustrates the unassembled, exploded condition of the dust collar 40, the alignment ring 42 and the splash ring 44. FIG. 4A is a section view of the assembled condition of the components shown in FIG. 3. As illustrated in FIGS. 3 and 4A, a series of connectors 54 are used to securely attach that alignment ring 42 to the dust collar 40. In this condition, the splash ring 44 is held between the alignment ring 42 and the dust collar 40.

Figure 5:
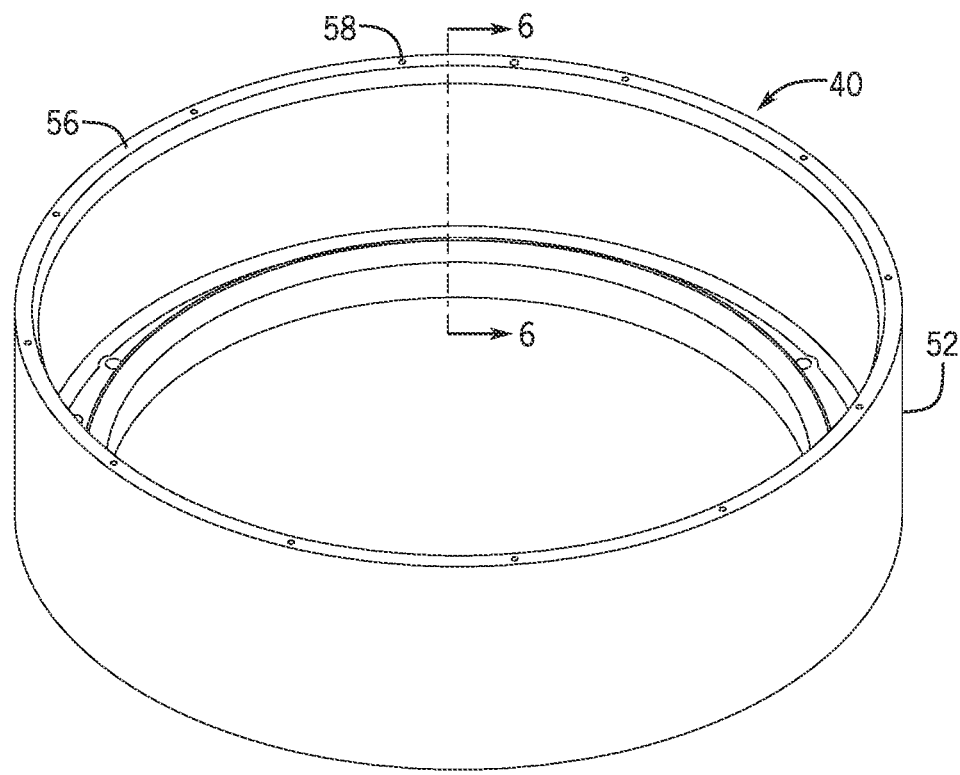
FIG. 5 is a perspective view of the dust collar.
Figure 6:
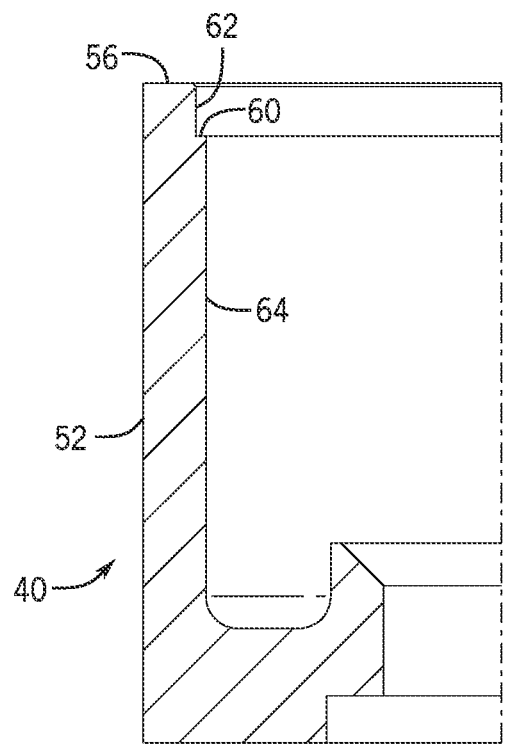
FIG. 6 is a section view taken along line 6-6 of FIG. 5.

Referring now to FIGS. 5 and 6, the dust collar 40 will be described in greater detail. The dust collar 40 is formed from a durable, metallic material such as steel and includes a radial outer surface 52 that is generally smooth and provides a sealing surface for the dust seal. The dust collar 40 designed in accordance with the present disclosure includes a generally planar top mounting surface 56. The top mounting surface 56 is designed to include a plurality of internally threaded mounting holes 58 that extend into the body of the dust collar 40 from the top mounting surface 56. The mounting holes 58 are equally spaced around the outer perimeter of the top mounting surface 56. As can be seen in the section view of FIG. 6, a support shoulder 60 is formed near the top mounting surface 56 of the dust collar 40 by creating an increased diameter upper support wall 62 that is recessed from the otherwise smooth inner surface 64. The combination of the support shoulder 60 and the support wall 62 provide a mounting location for the splash ring 44, as was shown in FIG. 4A.

Figure 7:
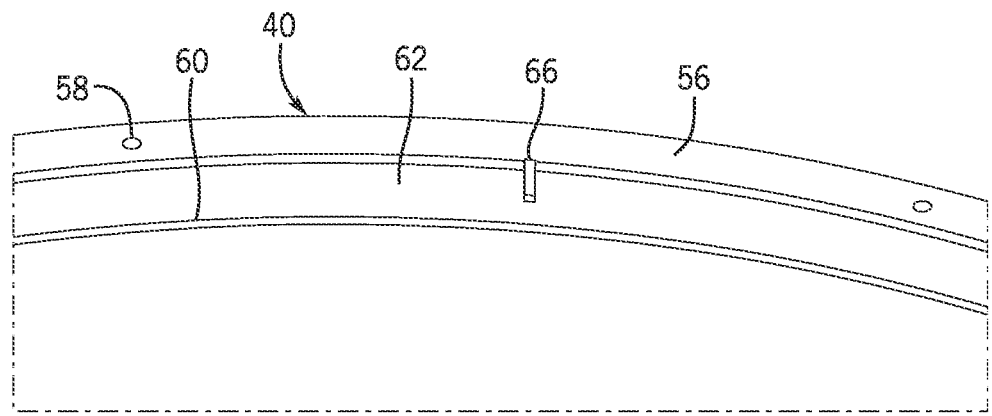
FIG. 7 is a magnified view showing the top mounting surface of the dust collar.

Referring now to FIG. 7, the generally planar top mounting surface 56 of the dust collar 40 is designed to include not only the mounting holes 58 but also one or more keyways 66 that are recessed from the upper support wall 62. The keyways 66 provide an alignment feature that allows the alignment ring 42 to be properly installed. The alignment ring 42 is designed to include a mating element that can be received within the keyways 66 to properly position the alignment ring 42 and the dust collar such that connectors can be used to securely attach the alignment ring 42 to the dust collar.

Figure 8:
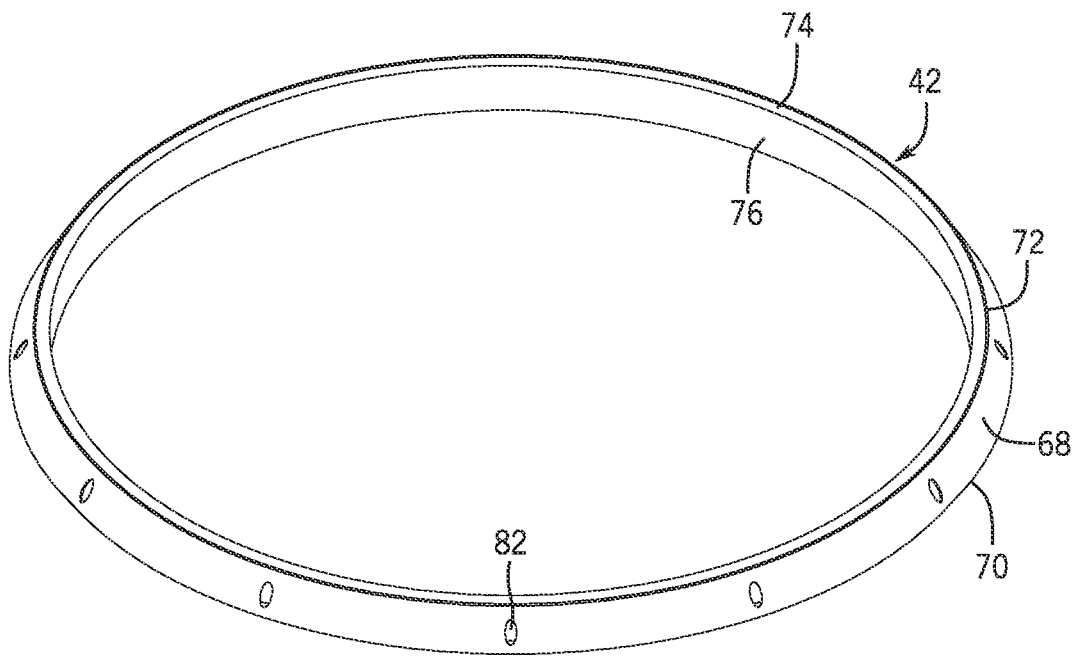
FIG. 8 is perspective view of the alignment ring.

Referring now to FIG. 8, one embodiment of the alignment ring 42 is shown. The alignment ring 42 is designed to be formed from a metal material and is a separate component from the dust collar as previously described. The alignment ring 42, as shown in FIGS. 4 and 8 includes a tapered contact surface 68 that extends from a lower, radial outer edge 70 to a top edge 72. In this manner, the radial dimension of the contact surface 68 of the alignment ring 42 decreases from the outer edge 70 to the top edge 72. The top edge 72 transitions to an angled top surface 74. The top surface 74 extends radially inward and terminates at an inner wall 76. As shown in FIG. 4A, the inner wall 76 extends below the top mounting surface 56 of the dust collar 40 to create an annular support wall 80. As shown in FIG. 4A, the annular support wall 80 contacts the support wall 62 formed as part of the dust collar 40 such that the alignment ring 42 can be securely held in place in a radial direction by the interaction between the support wall 80 of the alignment ring 42 and the support wall 62 of the dust collar 40.

Figure 4B:
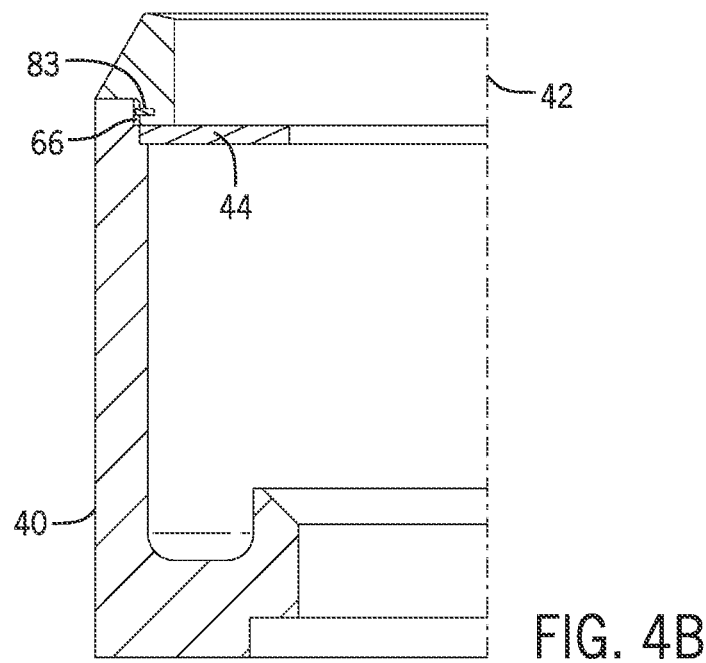
FIG. 4B is a section view similar to FIG. 4A at a different location showing the interaction between the spring pin of the alignment ring and the keyway of the dust collar.

Referring back to FIG. 8, the contact surface 68 includes a series of attachment openings 82 spaced around the outer diameter of the alignment ring 42. The attachment openings 82 each provide an access point for one of a series of connectors 54 that are used to attach the alignment ring 42 to the dust collar 40, as shown in the section view of FIG. 4A. The attachment openings 82 are equally spaced such that they align with the mounting holes 58 formed in the top mounting surface 56 of the dust collar. As shown in FIG. 4B and described previously, the dust collar 40 can include one or more keyways 66 that are designed to receive a spring pin 83 that extends through the alignment ring 42 to provide the proper alignment between the two components. The spring pin 83 on the alignment ring 42 will extend radially outward and will be received in the keyway 66. It is contemplated that the keyway 66 and the alignment pin 83 can each be located opposite an air blower hole 85 that extends through the outer wall of the dust collar 40 as shown in FIG. 3. A similar air blower hole is formed in the alignment ring 42 and is designed to align with the air blower hole formed in the dust collar 40. In this manner, the dust collar and the alignment ring will be properly aligned such that the air blower holes will allow air to pass through the dust collar and the alignment ring.

Figure 9:
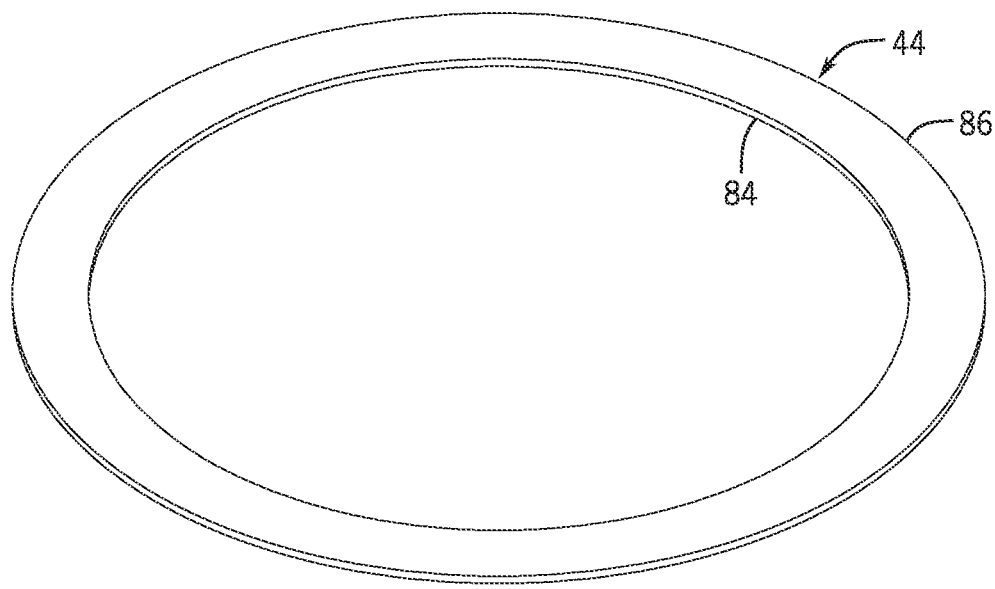
FIG. 9 is a perspective view of the splash ring.

FIG. 9 illustrates the annular splash ring 44 used in accordance with the dust sealing assembly of the present disclosure. The splash ring 44 includes an inner edge 84 and an outer edge 86 that define the width of the annular body of the splash ring 44. As previously described, the annular splash ring 44 is designed to be entrapped between the alignment ring 42 and the dust collar 40 as shown in FIG. 4. As can be seen in FIG. 4, the inner edge 84 is spaced radially inward from the inner surface 64 of the dust collar 40 to help prevent oil from splashing up and around the upper counterweight during operation of the crusher. The splash ring 44 is formed from a metallic material, such as steel or another similar material.

Figure 10:
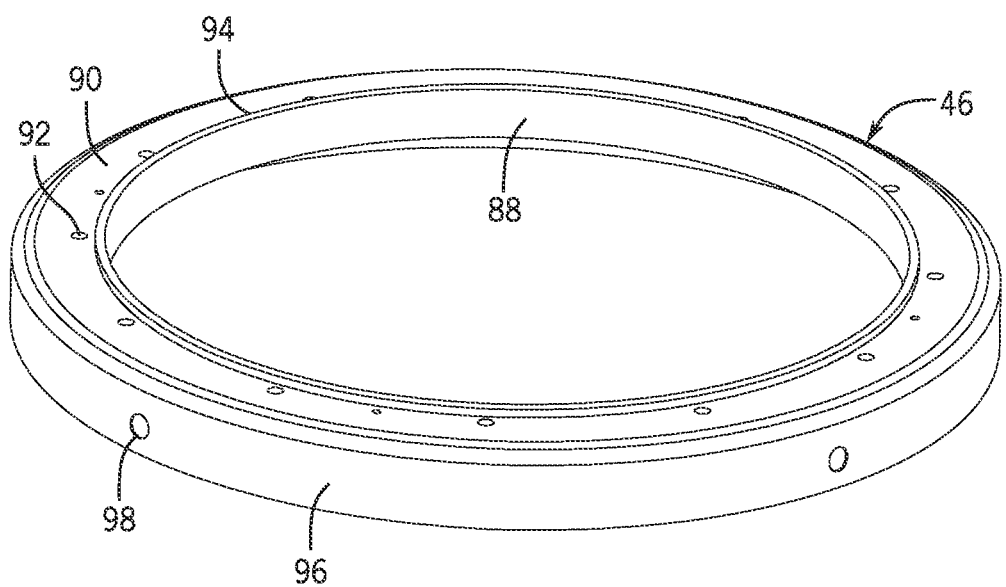
FIG. 10 is a perspective view of the dust seal retainer.
Figure 11:
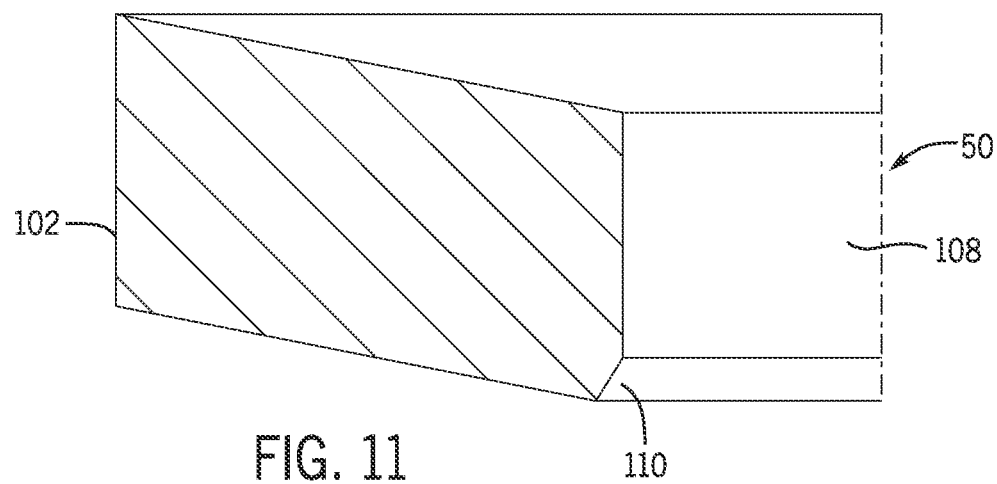
FIG. 11 is a perspective view of the dust seal showing a chamfer on the dust seal.

The second component of the dust sealing assembly is the combination of the dust seal retainer 46 shown in FIG. 10 and the dust seal 50 shown in FIG. 11. The dust seal 50 is formed from a durable rubber material and is designed to be movably received within the dust seal retainer 46 in a manner as will be described below. Referring now to FIG. 10, the dust seal retainer 46 includes an inner upper surface 88 that has an inner diameter that is larger than the outer diameter of the dust collar such that when the dust seal retainer 46 is installed, such as shown in FIG. 2, a space exists between the inner surface 88 of the dust seal retainer 46 and the outer surface of the dust collar 40.

Figure 12A:
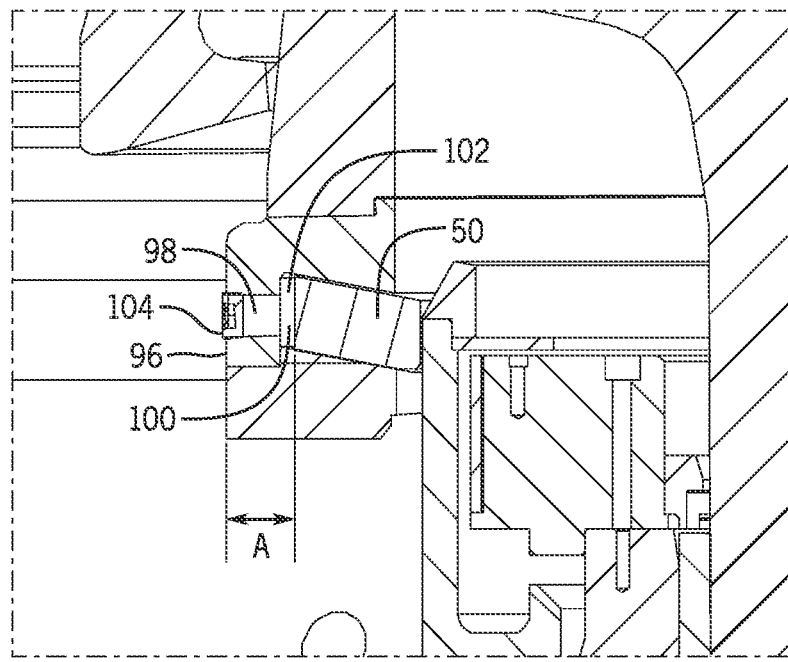
FIG. 12A is a section view showing the dust seal within the dust seal retainer and retracted to a distance A.
Figure 12B:
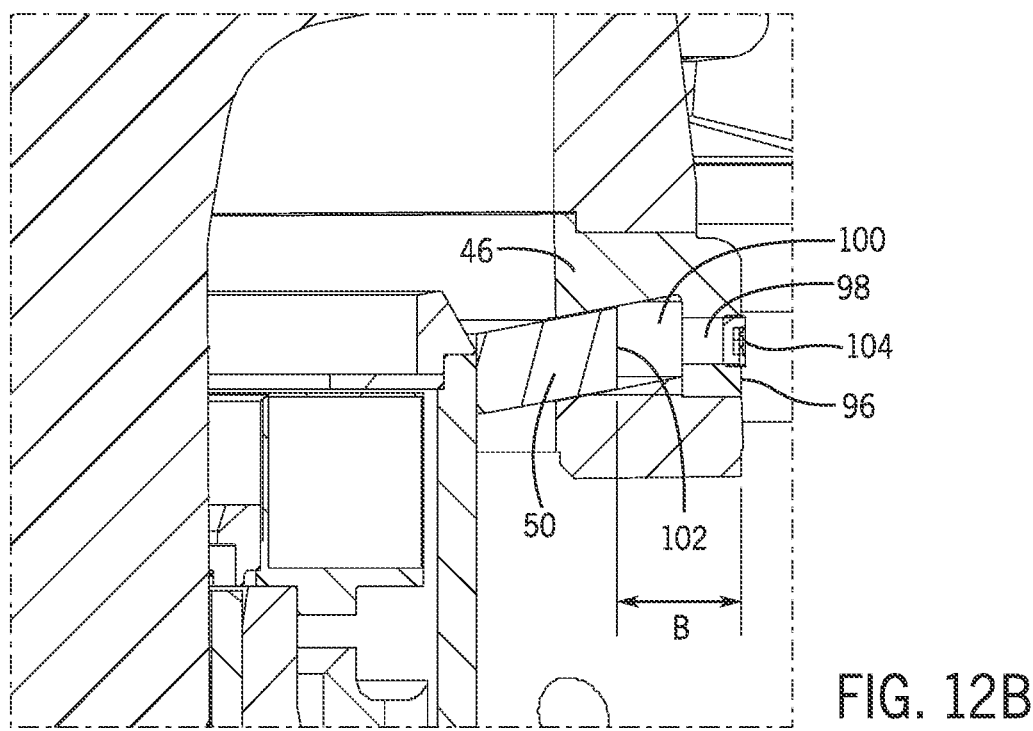
FIG. 12B is a section view showing the dust seal within the dust seal retainer and retracted to a distance B.

The dust seal retainer 46 includes a top attachment surface 90 that includes a series of openings 92 that are designed to allow the dust seal retainer 46 to be securely mounted to the mounting edge 48 of the main shaft 12 as described in FIG. 2. At an inner edge of the attachment surface 90 is a lip 94 that aids in restricting the radial movement of the dust seal retainer. As illustrated in FIG. 10, the dust seal retainer 46 includes an outer surface 96 that includes a series of adjustment openings 98. Referring now to FIGS. 12A and 12B, each of the adjustment openings 98 extends from the outer surface 96 to provide access to an internal receiving cavity 100 formed within the body of the dust seal retainer 46. The receiving cavity 100 is designed to receive the dust seal 50 such that the dust seal 50 can move into and out of the receiving cavity 100. In the embodiment shown in FIG. 12A, the outer edge 102 is spaced a distance A from the outer surface 96, while in the opposite side of the dust seal retainer 46 shown in FIG. 12B, the outer edge 102 is spaced a larger distance B from the outer surface 96.

Figure 13:
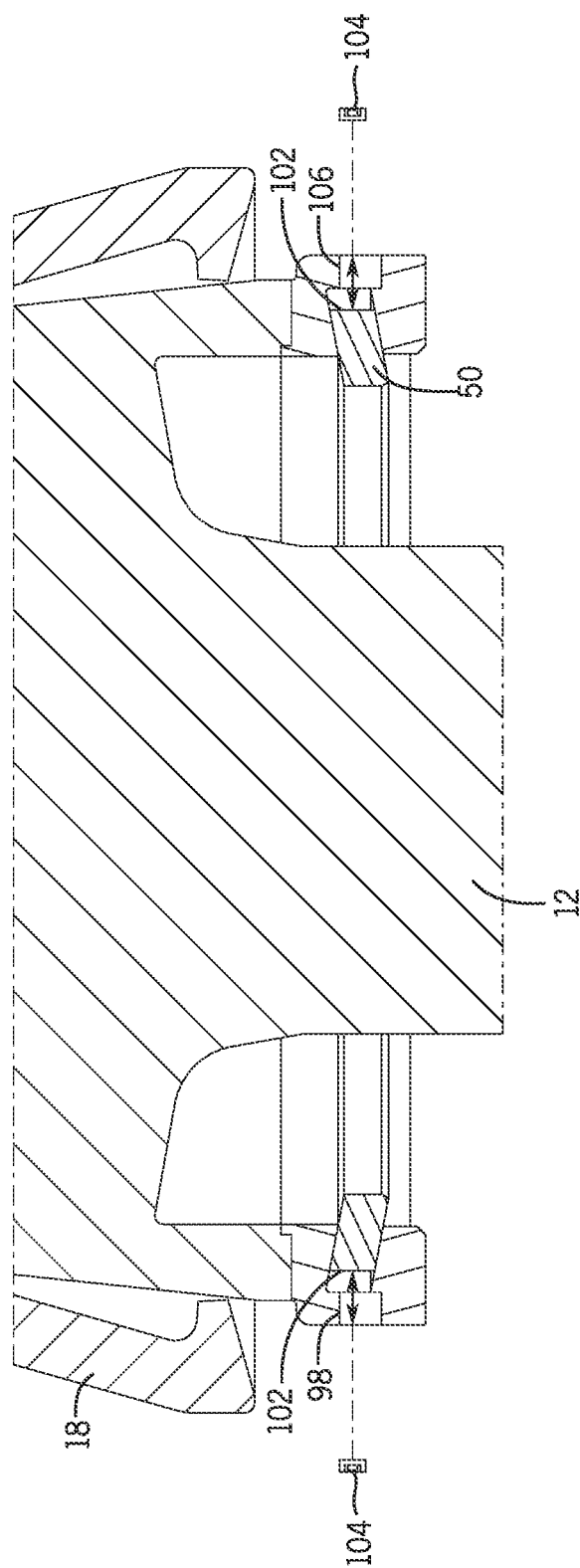
FIG. 13 is a section view showing the adjustability of the dust seal relative to the dust seal retainer.

As shown in FIGS. 12A and 12B, a pipe plug 104 is installed in each of the adjustment openings 98 to prevent debris from entering into the adjustment opening 98. During the initial assembly of the dust seal retainer, each of the pipe plugs 104 are removed and the dust seal 50 is centered as best shown in FIG. 13. As shown in FIG. 13, a force can be applied to the outer edge 102 of the dust seal 50, as shown by arrow 106, such that the dust seal 50 is centered relative to the main shaft 12. Once the dust seal 50 is centered, the pipe plugs 104 are reinserted into the adjustment openings 98. In this manner, the dust seal 50 can be centered prior to installation.

Figure 14:
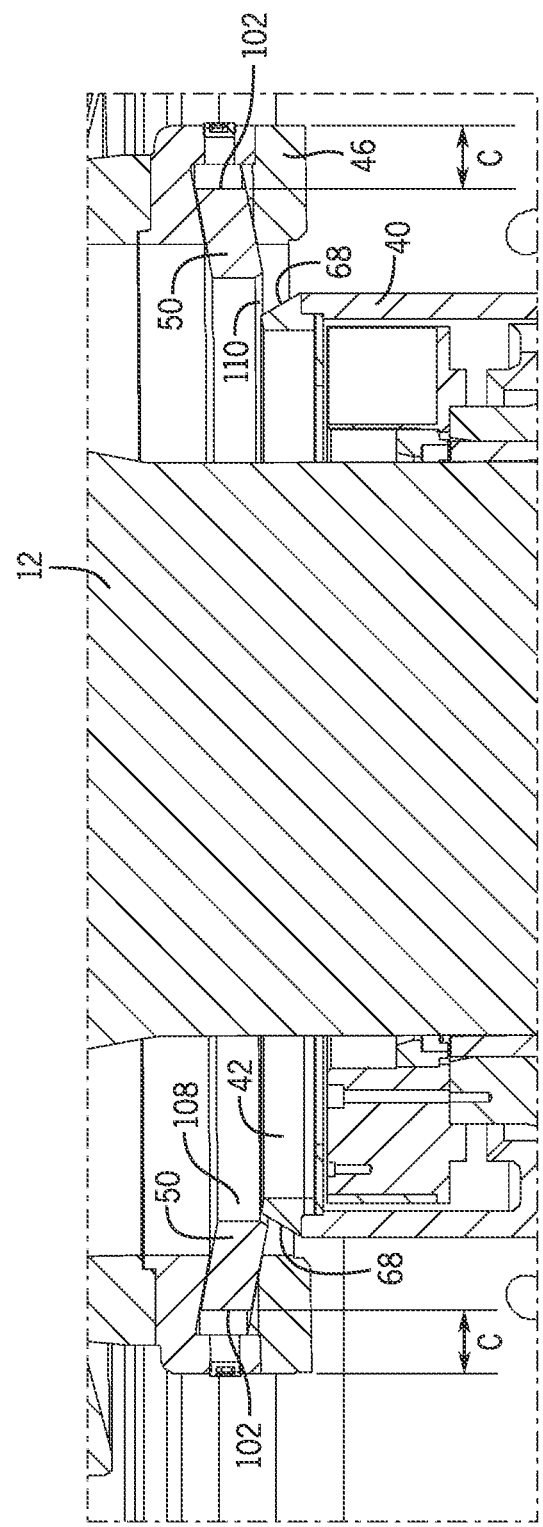
FIG. 14 is a section view showing the contact between the dust seal and the alignment ring as the main shaft is installed.

FIG. 14 illustrates the dust seal 50 properly centered relative to the dust seal retainer 46. As illustrated, the distance C to the outer edge 102 on both sides of the cross section illustrated is the same. In the embodiment shown in FIG. 13, the main shaft 12 is being installed in a slightly out of alignment condition since the dust seal 50 is properly located within the retainer 46, the chamfer 110 on the inner edge 108 of the dust seal will contact different areas on the tapered contact surface 68 of the alignment ring 42. The contact will urge the dust seal 50 into the required orientation within the dust seal retainer 46.

Referring back to FIG. 11, the dust seal 50 is designed to include a slight chamfer 110 on the lowermost portion of the inner edge 108. The chamfer 110 on the dust ring decreases the width of the dust seal 50 to provide additional clearance when the dust seal 50 initially contacts the contact surface of the alignment ring during installation. The chamfer 110 will also aid in guiding the dust seal 50 along the alignment ring 42 and the dust collar 40 during the assembly process.

Figure 15:
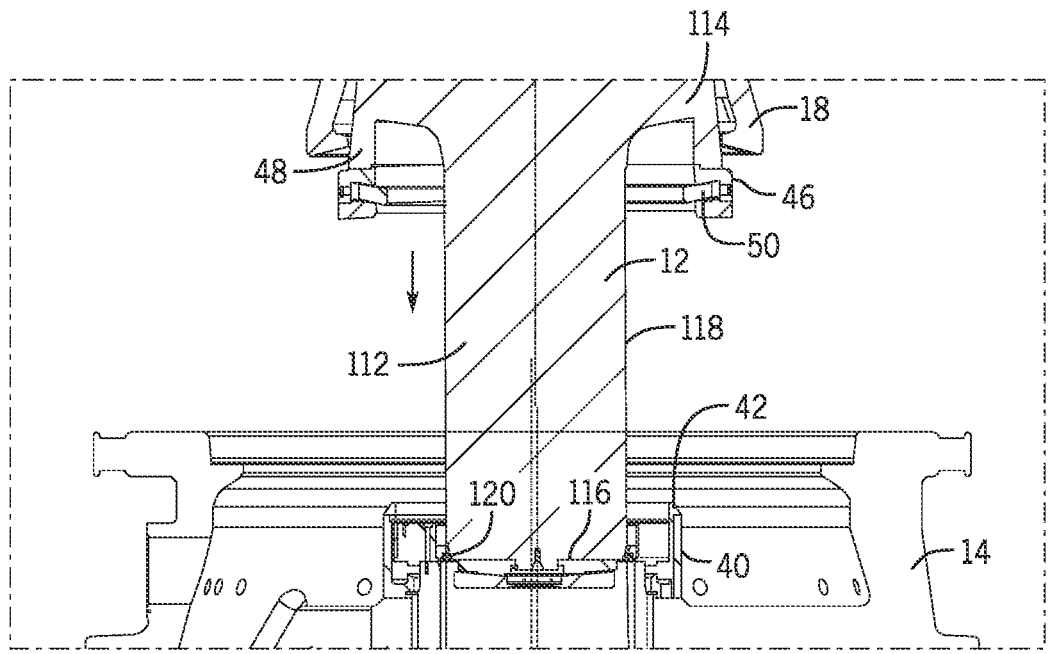
FIG. 15 is a section view showing the installation of the main shaft and the interaction with the bearing.

In addition to the dust sealing assembly previously described, the alignment system and method of the present disclosure further includes a modification to the main shaft itself to aid in the alignment of the main shaft during the initial installation. Referring now to FIG. 15, the main shaft 12 includes a lower portion 112 that is located below the upper portion 114 that includes the expanded diameter head that is used to support the mantle 18. The upper portion 114 also includes the mounting edge 48 that provides the point of attachment for the dust seal retainer 46 and the dust seal 50.

Figure 16:
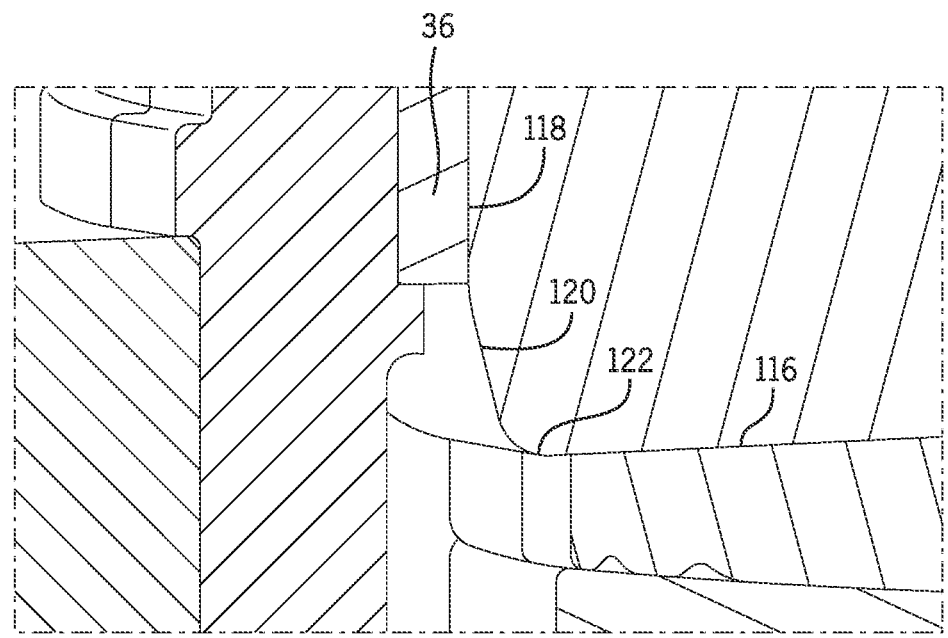
FIG. 16 is a magnified view of the chamfer formed on the lower end of the main shaft.

The lower portion 112 of the main shaft 12 initially must be centered within the dust collar 40 and the alignment ring 42. However, since the outer diameter of the lower portion 112 is significantly less than the inner diameter of the alignment ring 42, aligning the lower portion 112 within the alignment ring 42 can be done relatively easily. As the lower portion 112 of the main shaft 12 continues to move downward during installation as shown by the arrow in FIG. 15, the lower end 116 of the main shaft 12 must be properly aligned within the inner diameter of the bushing 36. Since the bushing 36 is in contact with the outer surface 118 of the lower portion 112 during use, there is very little tolerance between the outer surface 118 and the inner surface of the bushing 36. In accordance with the present disclosure, the lower end 116 of the main shaft 12 includes a chamfer 120. As shown in FIG. 16, the chamfer 120 provides a transition from the first diameter of the lower end 116 to the larger second, outer diameter defined by the outer surface 118. The chamfer 120 begins at the transition point 122 and slowly increases the diameter of the lower portion of the main shaft until the diameter reaches the outer surface 118. As shown in FIG. 16, the outer surface 118 of the main shaft is designed to be in close contact with the bushing 36. The chamfer 120 thus aids in the installation of the main shaft as can be understood in FIGS. 15 and 16. Prior art main shafts, such as shown in FIG. 1, include an abrupt transition from the bottom end of the main shaft to the outer surface and are thus much more difficult to align with the bushing 36 during installation.

The use of the system and method for aligning the main shaft during the installation process will now be described with reference to the drawing figures previously described. Initially, the dust collar 40 is installed on the lower frame 14 of the gyratory crusher, as illustrated in FIG. 15. Once the dust collar 40 has been installed, the eccentric assembly without the counterweight is installed from the bottom of the crusher as is conventional. Once the eccentric assembly has been installed, the larger upper counterweight is installed, also in a conventional manner.

After the dust collar 40 has been installed, the splash ring 44 is placed on the support shoulder 60 of the dust collar as shown in FIGS. 4B and 6. The splash ring 44 is supported by the support shoulder 60 that extends around the entire dust collar as defined by the support wall 62. As the splash ring is supported along the support shoulder of the dust collar, the spring pin 83 is inserted into the alignment ring that will be used for properly aligning the alignment ring relative to the dust collar.

Once the alignment ring has been prepared, the alignment ring is placed on top of the dust collar in a position such that the spring pin 83 on the alignment ring is received within the keyway 66 as shown in FIG. 4B. The interaction between the spring pin 83 and the keyway 66 ensures the proper orientation of the alignment ring 42 relative to the dust collar 40. During this process, the dust collar ensures that the alignment ring sits flush on the top mounting surface 56. Once the alignment ring 42 is properly positioned, the series of connectors 54 are used to secure the alignment ring 42 to the dust collar.

Once the dust collar and alignment ring, including the splash ring, are assembled, the main shaft can be prepared for installation. During this preparation process, the dust seal retainer is securely fastened to the main shaft. Once the dust seal retainer 46 has been installed, each of the four removable pipe plugs 104 are removed. Once the pipe plugs 104 have been removed, the installer can measure the distance from the outer surface 96 of the dust seal retainer to the outer edge 102 of the dust seal 50. This depth can be measured utilizing a variety of different methods and components. As one exemplary embodiment, a tool can be used that sets the desired depth of the outer edge 102 from the outer surface 96. In another contemplated embodiment, an optical or ultrasound measuring device can be used to measure the depth of the dust seal. Based upon these measurements, the installer adjusts the depth of the dust seal at each of the four locations until the depth is the same at each of these measurement sites. In this manner, the dust seal can be centered within the retainer, which aids in the installation process.

Once all four measurements have been made and the dust seal properly adjusted, the installer reinstalls the pipe plugs 104 within the dust seal retainer to prevent debris from entering into the adjustment openings 98 during operation.

Once the dust seal has been adjusted and the dust collar and alignment ring joined to each other, the operator lubricates the lower journal of the main shaft, the outside diameter of the dust collar and the inside of the seal. After the proper lubrication, the main shaft is lifted into position and can be lowered as indicated in FIG. 15. Since the lower end 116 of the main shaft 12 includes the chamfer 120, the chamfer 120 aids in aligning the main shaft within the bushing 36. As the main shaft 12 is continuously lowered, the dust seal will come into contact with the contact surface 68 on the alignment ring as shown in FIG. 14. The interaction between the chamfer 110 formed on the dust ring 50 and the contact surface 68 aids in centering the main shaft during the installation process.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system for aligning a main shaft in a gyratory crusher, comprising:
   a dust collar having an outer diameter defined by a radial outer surface and a planar top mounting surface;
   an alignment ring formed as a continuous ring separate from the dust collar and removably mounted to the top mounting surface of the dust collar, the alignment ring including a tapered contact surface extending from a lower outer edge of the alignment ring to a top edge of the alignment ring, wherein the lower outer edge is aligned in a vertical direction with an upper edge of the outer surface of the dust collar when the alignment ring is mounted to the top mounting surface;
   a dust seal retainer having an inner wall having an inner diameter larger than the outer diameter of the dust collar; and
   a dust seal movably received within the dust seal retainer and extending radially inward from the inner wall of the dust seal retainer to contact the outer surface of the dust collar, wherein the position of the dust seal within the dust seal retainer can be adjusted.

2. The system of claim 1 further comprising an annular splash ring mounted and retained between the dust collar and the alignment ring.

3. The system of claim 2 wherein the annular splash ring includes an inner edge that is spaced radially inward from an inner surface of the dust collar.

4. The system of claim 1 wherein the top mounting surface of the dust collar includes a plurality of mounting holes and an alignment keyway, wherein a plurality of connectors are received within the mounting holes to secure the alignment ring to the dust collar.

5. The system of claim 4 wherein the alignment ring includes an alignment pin that is received within the alignment keyway of the dust collar.

6. The system of claim 1 wherein the dust seal retainer includes a receiving cavity and an outer surface, wherein a plurality of adjustment openings extend radially inward from the outer surface into communication with the receiving cavity.

7. The system of claim 6 wherein the dust seal is movably received within the receiving cavity such that an outer edge of the dust seal is accessible through the plurality of adjustment openings.

8. The system of claim 1 wherein an inner edge of the dust seal is tapered.

9. A gyratory crusher, comprising:
a main shaft having a lower portion defined by an outer surface having a first diameter and a lower end having a second diameter that is less than the first diameter, the main shaft further comprising an alignment chamfer extending from the lower end to the outer surface of the lower portion;
a bearing assembly having an inner surface having a third diameter that is generally the same as the first diameter, wherein the bearing assembly surrounds the lower portion of the main shaft when the main shaft is in an operating position;
a dust collar having a top mounting surface and an outer diameter defined by a radial outer surface;
an alignment ring formed as a continuous ring separate from the dust collar and removably mounted to the top mounting surface of the dust collar, the alignment ring including a tapered contact surface extending from a lower outer edge of the alignment ring to a top edge of the alignment ring, wherein the lower outer edge is aligned in a vertical direction with an upper edge of the outer surface of the dust collar when the alignment ring is mounted to the top mounting surface;
a dust seal retainer mounted to the main shaft and having an inner diameter larger than the outer diameter of the dust collar; and
a dust seal movably received within the dust seal retainer and extending radially inward from the dust seal retainer to contact the outer surface of the dust collar.

10. The gyratory crusher of claim 9 wherein the dust seal retainer includes a receiving cavity and an outer surface, wherein a plurality of adjustment openings extend radially inward from the outer surface into communication with the receiving cavity.

11. The gyratory crusher of claim 10 wherein the dust seal is movably received within the receiving cavity such that an outer edge of the dust seal is accessible through the plurality of adjustment openings.

12. A gyratory crusher, comprising:
a main shaft;
a dust collar having an outer diameter defined by a radial outer surface and a planar top mounting surface;
an alignment ring formed as a continuous ring separate from the dust collar and removably mounted to the top mounting surface of the dust collar, the alignment ring including a tapered contact surface extending from a lower outer edge of the alignment ring to a top edge of the alignment ring, wherein the lower outer edge is aligned in a vertical direction with an upper edge of the outer surface of the dust collar when the alignment ring is mounted to the top mounting surface;
a dust seal retainer having an inner wall having an inner diameter larger than the outer diameter of the dust collar; and
a dust seal movably received within the dust seal retainer and extending radially inward from the inner wall of the dust seal retainer to contact the outer surface of the dust collar, wherein the position of the dust seal within the dust seal retainer can be adjusted.

13. The gyratory crusher of claim 12 further comprising an annular splash ring mounted and retained between the dust collar and the alignment ring.

14. The gyratory crusher of claim 13 wherein the annular splash ring includes an inner edge that is spaced radially inward from an inner surface of the dust collar.

15. The gyratory crusher of claim 12 wherein the dust seal retainer includes a receiving cavity and an outer surface, wherein a plurality of adjustment openings extend radially inward from the outer surface into communication with the receiving cavity.

16. The gyratory crusher of claim 15 wherein the dust seal is movably received within the receiving cavity such that an outer edge of the dust seal is accessible through the plurality of adjustment openings.

17. The gyratory crusher of claim 12 wherein the main shaft comprises a lower portion defined by an outer surface having a first diameter and a lower end having a second diameter that is less than the first diameter, the main shaft further comprising an alignment chamfer extending from the lower end to the outer surface of the lower portion.

18. The gyratory crusher of claim 12 wherein an inner edge of the dust seal is tapered.

* * * * *